United States Patent
Stenqvist et al.

(10) Patent No.: US 11,686,237 B2
(45) Date of Patent: Jun. 27, 2023

(54) CONTROLLING NOX EMISSION CONTROL DURING START OF A VEHICLE

(71) Applicant: VOLVO TRUCK CORPORATION, Gothenburg (SE)

(72) Inventors: Dan Stenqvist, Västra Frölunda (SE); Martin Wilhelmsson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/808,213

(22) Filed: Jun. 22, 2022

(65) Prior Publication Data
US 2023/0003163 A1 Jan. 5, 2023

(30) Foreign Application Priority Data
Jul. 2, 2021 (EP) ...................... 21183463

(51) Int. Cl.
*F01N 11/00* (2006.01)
*F01N 13/00* (2010.01)
*F02D 41/02* (2006.01)
*F02D 41/06* (2006.01)

(52) U.S. Cl.
CPC .......... *F01N 11/002* (2013.01); *F01N 13/008* (2013.01); *F02D 41/021* (2013.01); *F02D 41/062* (2013.01); *F01N 2560/02* (2013.01); *F01N 2560/026* (2013.01); *F01N 2560/20* (2013.01); *F01N 2900/0416* (2013.01)

(58) Field of Classification Search
CPC ................. F01N 2560/026; F01N 2560/20
See application file for complete search history.

(56) References Cited

U.S. PATENT DOCUMENTS

2020/0298701 A1 * 9/2020 Meier ...................... F01N 9/00
2021/0087990 A1 3/2021 Paukner et al.

FOREIGN PATENT DOCUMENTS

| DE | 10150510 A1 | 7/2002 | |
| DE | 102012205017 A1 | 10/2012 | |
| DE | 102016200721 A1 | 7/2017 | |
| DE | 102019126613 A1 * | 11/2019 | ............. B01D 53/04 |
| WO | 2006117357 A1 | 11/2006 | |
| WO | 2019209163 A1 | 10/2019 | |

OTHER PUBLICATIONS

Machine translation of DE 102012205017 A1, accessed Nov. 1, 2022. (Year: 2022).*
European Search Report in corresponding European Application No. 21183463.5 dated Dec. 22, 2021 (9 pages).

* cited by examiner

*Primary Examiner* — Jonathan R Matthias
(74) *Attorney, Agent, or Firm* — Venable LLP; Jeffri A. Kaminski

(57) ABSTRACT

A method for NOx emission control during start of a vehicle comprising an exhaust aftertreatment system, an engine, and a NOx sensor is provided. The method includes determining a temperature of the NOx sensor; if the determined temperature of the NOx sensor is below a predetermined threshold, initiating heating of the NOx sensor, and performing a preventive action for delaying engine start until a determined temperature of the NOx sensor exceeds or is equal to the predetermined threshold.

12 Claims, 3 Drawing Sheets

CONTROLLING NOX EMISSION CONTROL DURING START OF A VEHICLE

TECHNICAL FIELD

The present disclosure relates to a method for NOx emission control during start of a vehicle comprising an exhaust aftertreatment system, an engine, and a NOx sensor. The present disclosure also relates to a corresponding exhaust aftertreatment system. Although the method and system will be described in relation to a vehicle in the form of a truck, the method and system can also be efficiently incorporated in other vehicles types such as e.g. buses and construction equipment.

BACKGROUND

During cold starts of vehicles, it is difficult to control NOx emissions which tend to be higher at cold starts. NOx emission control performed by cold start On Board Diagnostics (OBD) and On Board monitoring (OBM) processes relies on measurements performed by NOx sensors in the exhaust aftertreatment systems of the vehicle.

To perform On Board Diagnostics of NOx emissions during a cold start is challenging since the NOx sensors require time to warm up and start before they can provide accurate readings. The current NOx sensors are sensitive to humidity and therefore starting the sensor is typically delayed until water on the sensor has vaporized. However, by the time the NOx sensor is warmed up, the cold start sequence of the vehicle is nearly ended and the opportunity to perform emission control and diagnostics during the cold start is lost or at least cannot be optimally performed.

Emission control, diagnostics, and monitoring have attracted much attention due to the environmental impact of emissions. Therefore, at least for this reason, it is of interest to improve such emission control, especially during cold starts.

SUMMARY

An object of the invention is to provide a method and system for NOx emission control during start of a vehicle that at least partly alleviates the deficiencies with the prior art.

According to the first aspect of the invention, there is provided a method for NOx emission control during start of a vehicle comprising an exhaust aftertreatment system, an engine, and a NOx sensor, the method comprising the steps of: determining a temperature of the NOx sensor; if the determined temperature of the NOx sensor is below a predetermined threshold, initiating heating of the NOx sensor, and, performing a preventive action for delaying engine start until the determined temperature of the NOx sensor exceeds or is equal to the predetermined threshold.

The present invention is based on the realization that by allowing the NOx sensor to heat up prior to engine start, provides for more efficient use of the NOx sensor during cold starts. By means of the method, the NOx sensor is ready to provide accurate measurements when the engine is started so that efficient emission control can be performed also during cold starts.

Thus, by the provision of the herein proposed method, improved emission control and therefore also reduced NOx emission levels during cold starts is achieved.

The temperature of the NOx sensor may be determined by a temperature sensor directly on the NOX sensor. Further, the NOx sensor may comprise its own temperature sensing means for determining its temperature for determining whether it is ready to be activated and used. Thus, the NOx sensor may provide its own signal indicating that it is activated, or at least ready to be activated, once its temperature is above or at the predefined temperature.

However, in other possible implementations, the temperature of the NOx sensor may be determined by a temperature sensor arranged in the exhaust gas stream near the NOx sensor. The temperature of the NOx sensor may then be assumed to be close to the temperature of the exhaust gas stream measured near the NOx sensor, or a model or other type of estimation is used for calculating or estimating a temperature of the NOx sensor based on the temperature of the exhaust gas near the NOx sensor. Near the NOx sensor may be considered in direct proximity of the sensor, or as close as reasonably possible without touching the NOx sensor and compromising its performance.

The preventive action is performed to directly or indirectly cause a delay in starting the engine so that the NOx sensor is allowed sufficient time to heat up to a temperature that ensure proper operation of the NOx sensor. Once sufficiently warm, the NOx sensor can provide accurate emission level measurements during the engine cold start.

Once the temperature of the NOx sensor is determined, or estimated, to be equal to or exceed the predetermined threshold, the preventive action may be terminated.

NOx sensors are commonly used in exhaust gas aftertreatment systems of vehicles and are configured to detect and measure the levels of nitrogen oxides in the exhaust gas. NOx sensors are considered known per se and details about their operation and functionality will not be described in detail herein.

The engine is preferably an internal combustion engine. The internal combustion engine may be diesel engine or a gasoline engine or any other type of internal combustion engine. The internal combustion engine may be part of a hybrid driveline partly powered by a battery.

According to an example embodiment, performing a preventive action may comprise preventing the engine to start. This preventive action is such that even if an occupant of the vehicle attempts to start the engine, the engine will not start and is thus forced to maintain off. Thus, engine start, e.g. ignition, is not allowed until the NOx-sensor is sufficiently warm. This ensures that the NOx-sensor has reached proper operating temperature and can provide accurate measurements.

According to an example embodiment, performing a preventive action may comprise generating a signal with instructions informing the driver to delay starting the engine. Thus, the preventive action may be a message encouraging the driver to delay engine start. The instructions may be provided as a message in the form of a "pop-up" message in the driver interface. It could also be an information message using audio, or with a lamp lighting up in the driver interface. It could potentially also be a combination of the different types of messages. With a less forcing preventive action the driver may override the prevention in case of e.g. emergencies.

According to an example embodiment, the signal with instructions informing the driver to delay starting the engine may be generated upon initiating heating of the NOx sensor. Hereby, a confirmation that NOx sensor heating is initiated is provided which allows for better timing of other tasks by the user. The instructions may for example include information about how long the delay to engine start is expected to be.

According to an example embodiment, the method may comprise initiating cold start on board diagnostics and/or on-board monitoring once the engine is started. Generally, when the engine and aftertreatment system is cold and the engine starts, the exhaust emissions are higher than when the system and engine have heated up. This is due to that NOx conversion in the aftertreatment system requires relatively high exhaust gas temperatures to work efficiently. Early initiation of cold start diagnostics and/or on-board monitoring advantageously provides for efficient monitoring of cold start emissions. In this way, any potential faults can be detected quickly by analysing the NOx levels. Further, monitoring the cold start NOx emissions over time may be advantageous since it allows for tracking cold start performances of the vehicles during their complete lifetime. For example, this enables detecting and tracking aging of the exhaust aftertreatment systems.

According to an example embodiment, the method may further comprise activating the NOx sensor when the measured temperature of the NOx sensor exceeds or is equal to the predetermined threshold. To activate the NOx sensor means that the sensor can start to send useful measurement values to an engine control unit. The NOx sensor element needs to be relatively warm, e.g. approximately 800° C. to work efficiently. When the NOx sensor is activated and sending useful measurement values, these values can be used by the control systems to convert NOx with as high performance as possible, or at least with an acceptable level of performance.

Heating of the NOx sensor is performed in a controlled way at a heating rate that is sufficiently low to not damage the sensor or cause unnecessary wear and tear on the NOx sensor.

According to an example embodiment, heating of the NOx sensor may be performed such that water accumulated on the NOx sensor is vaporized in a controlled way so that damage to the NOx sensor due to expanding water vapor is prevented. Thus, heating of the NOx sensor is performed at a slow rate so that the heating does not cause damage to the NOx sensor. The heating rate is such that the water on the sensor can vaporize out and away from the sensor at a rate such that the expansion thereof does not cause damage to the NOx sensor. For example, the NOx sensor is heated to about 800° C. in about 10-60 seconds depending on the surrounding temperature.

According to the second aspect of the invention, there is provided an exhaust aftertreatment system of a vehicle comprising: an exhaust pipe section for transferring exhaust gas towards an exhaust gas outlet; a NOx sensor arranged in the exhaust pipe for measuring a level of nitrogen oxides in the exhaust gas; a heater arranged to heat the NOx sensor, and a sensor for determining a temperature of the NOx sensor; and the system further comprising a control unit configured to cause a preventive action for delaying engine start until a determined temperature of the NOx sensor exceeds or is equal to the predetermined threshold.

According to an example embodiment, the control unit may be configured to prevent the vehicle to start until the determined temperature of the NOx sensor exceeds the threshold, and/or to generate a signal with instructions informing the driver to delay starting the engine.

According to an example embodiment, the heater may be controllable to heat the NOx sensor at a heating rate to vaporize water accumulated on the NOx sensor such that damage to the NOx sensor due to expanding water vapor is prevented.

According to an example embodiment, the heater comprises an electrical heating element or a heating element powered by the same type of fuel as the engine.

Effects and features of the second aspect of the invention are largely analogous to those described above in connection with the first aspect.

According to a third aspect of the invention, there is provided a vehicle comprising the exhaust aftertreatment system according to the second aspect.

According to a fourth aspect of the invention, there is provided a computer program comprising program code means for performing the steps of the first aspect when the program is run on a computer.

According to a fifth aspect of the invention, there is provided a computer readable medium carrying a computer program comprising program code means for performing the steps of the first aspect when the program product is run on a computer.

According to a sixth aspect of the invention, there is provided a control unit for controlling NOx emission during start of a vehicle comprising an exhaust aftertreatment system and a NOx sensor, the control unit being configured to perform the steps of the method according to the first aspect.

Effects and features of the third, fourth, fifth, and sixth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
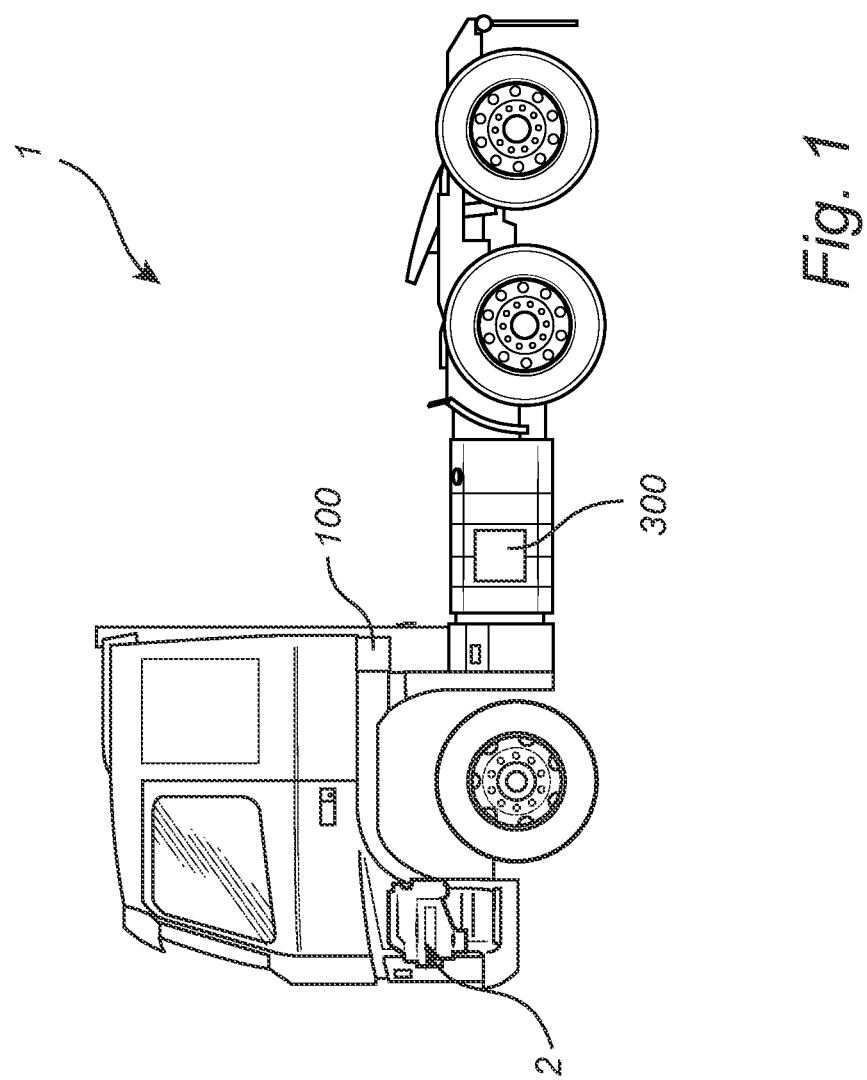
FIG. 1 is a vehicle in the form a truck according to example embodiments of the invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims.

Like reference character refer to like elements throughout the description.

FIG. 1 illustrates a vehicle in the form of a truck 1 comprising an engine 2 such as for example an internal combustion engine. The internal combustion engine may be e.g. a diesel engine or a gasoline engine or any other type of internal combustion engine. The truck 1 may be a hybrid electric vehicle. The truck 1 further comprises an exhaust gas aftertreatment system 300 including e.g. catalytic devices, urea injectors, and nitrogen oxide sensors, and will be discussed in further with reference to subsequent drawings. The truck 1 further comprises a control unit 100 that will also be discussed with reference to subsequent drawings.

Figure 2:
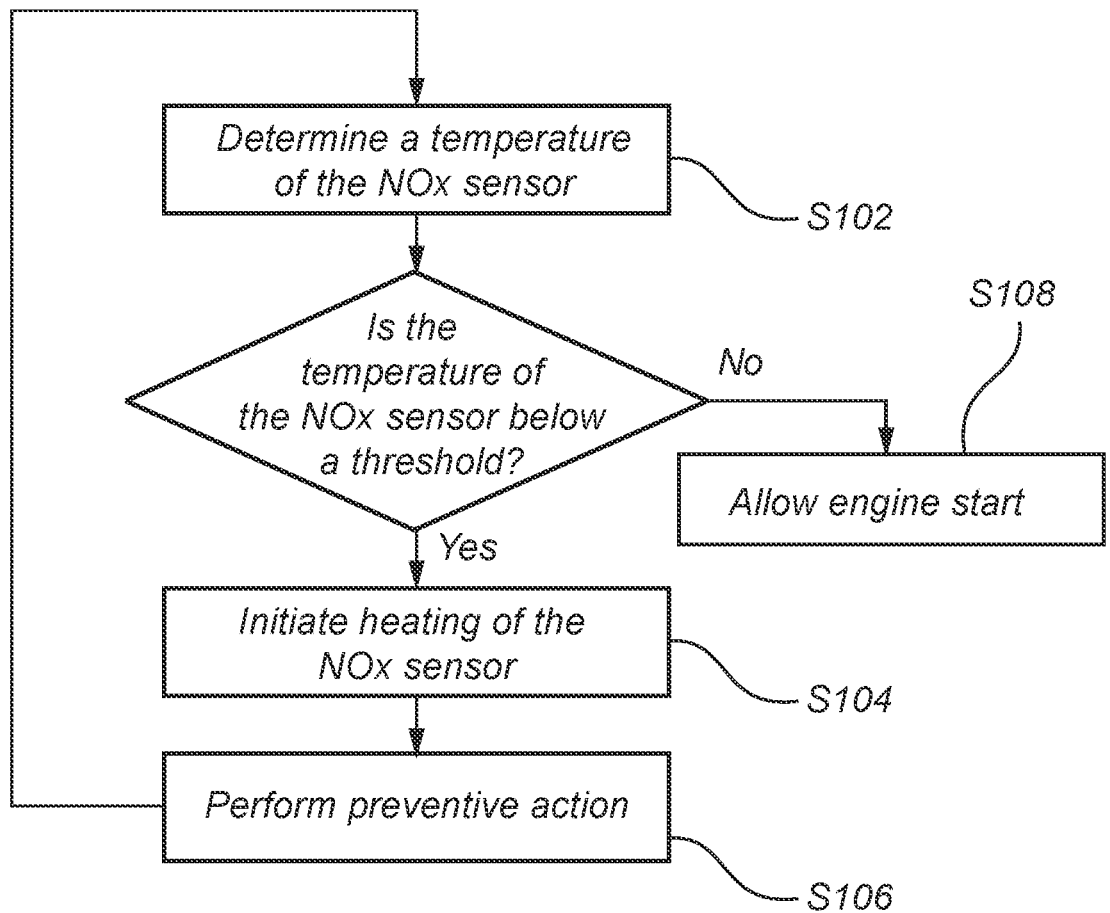
FIG. 2 is a flow-chart of method steps according to example embodiments of the invention.
Figure 3:
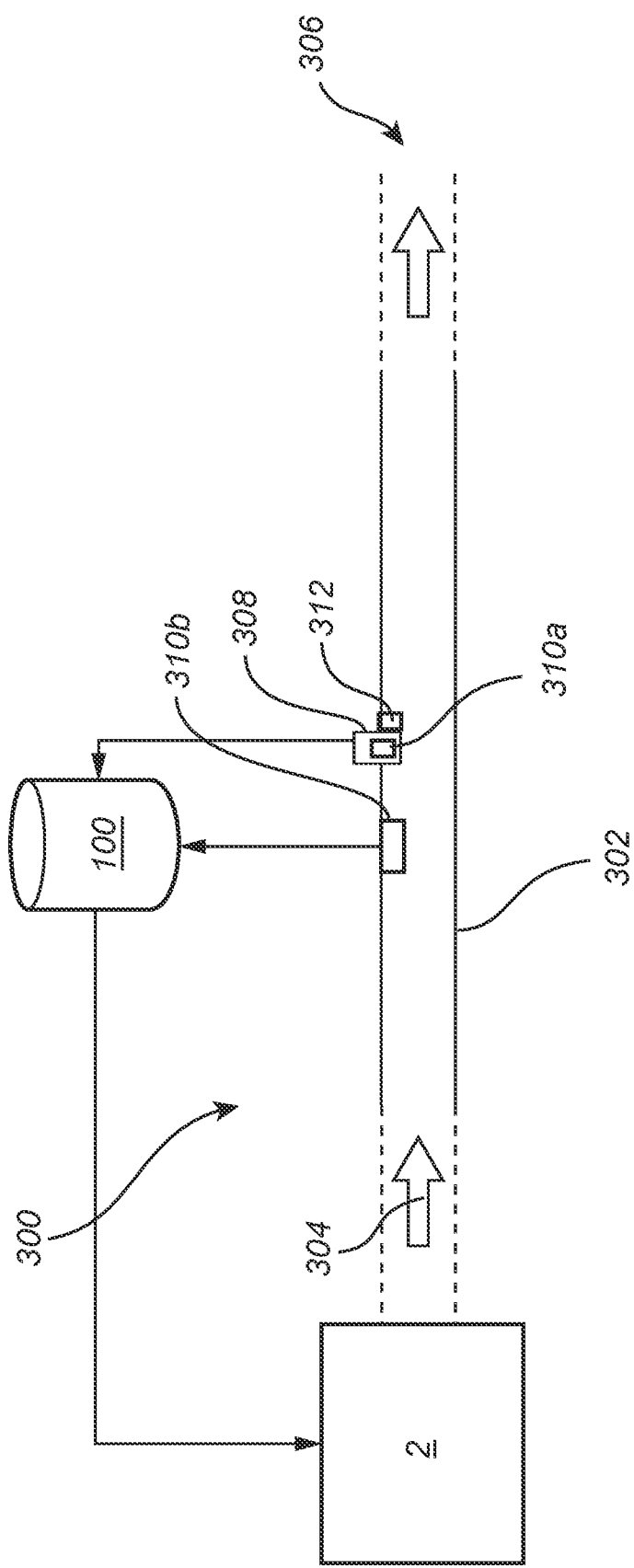
FIG. 3 is a schematic illustration of a system according to example embodiments of the invention.

FIG. 2 is a flow-chart of method steps according to embodiments of the invention and FIG. 3 conceptually illustrates an exhaust aftertreatment system 300 according to embodiments of the invention.

The exhaust aftertreatment system 300 comprises an exhaust pipe section 302 for transferring exhaust gas 304 towards an exhaust gas outlet 306. The exhaust pipe section 302 is part of a larger transfer system for transferring exhaust gas from the engine 2 to an exhaust gas outlet 306. Generally, the aftertreatment system 300 may comprise catalytic units (e.g. selective catalytic reduction devices), urea injectors, ammonia-slip catalysts, diesel oxidation catalyst, particulate filters, exhaust gas temperature sensors, and other components that are per se known to the skilled person and will not be described in detail herein.

A NOx sensor 308 is arranged in the exhaust pipe section 302 for measuring a level of nitrogen oxides (NOx) in the exhaust gas 304. Further, a heater 312 is arranged to heat the NOx sensor 308. The NOx sensor 308 may comprise its own heater integrated with the NOx-sensor, or the heater is an external heater arranged in contact with the housing of the NOx sensor 308, or at least in close proximity to the NOx sensor 308, sufficiently close to be able to heat the NOx sensor 308 in accordance with embodiments herein.

Here, a single NOx sensor 308 is depicted. However, in practical applications, there is typically more than one NOx sensor in the aftertreatment system. For example, a first NOx sensor may be arranged upstream of a selective catalytic reduction unit and a second NOx sensor may be arranged downstream of the selective catalytic reduction unit and possibly downstream of an ammonia-slip catalyst.

The locations of the NOx sensors in the aftertreatment system depend on the specific implementation at hand and various possibilities exist and are within the scope of the invention.

In step S102, a temperature of the NOx sensor 308 is determined. This temperature may be determined by a temperature sensor arranged on and being dedicated to the NOx sensor. However, preferably, the NOx sensor 308 has its own internal circuitry and sensor 310a for determining its temperature, or at least whether it is ready for activation. In some possible implementations a sensor 310b arranged to measure the temperature of the exhaust gas in the transfer pipe 302 is located near the NOx sensor 308. In this way the temperature of the NOx sensor 308 can be estimated from the temperature measured by the sensor 310b, or the temperature measured by the sensor 310b can be used as an indication of the temperature of the NOx sensor 308.

It is next evaluated whether the determined temperature of the NOx sensor 308 is below a predetermined threshold, and if so, initiating heating of the NOx sensor 308 in step S104. Thus, the temperature sensor of the NOX sensor may indicate that the measured temperature is below the predetermined threshold, whereby the heater 312 is responsive to initiate heating of the NOx sensor 308.

Further, in step S106 a preventive action is performed for delaying engine start until a determined temperature of the NOx sensor 308 exceeds or is equal to a predetermined threshold. For this, the system 300 further comprises a control unit 100 configured to cause the preventive action. For example, the control unit 100 may prevent the engine 2 to start, i.e. the preventive action is a hard action forcing the engine 2 to continue to be off until the NOx sensor 308 is at its predefined temperature. In other embodiments, the preventive action, caused by the control unit 100 is of a more instructive nature and comprises generating a signal with instructions informing the driver to delay starting the engine 2. The signal may be generated upon initiating heating of the NOx sensor 308.

Thus, the preventive action could either be a "hard" prevention, where an engine control unit could inhibit start of the engine 2 before the NOx sensor 308 has reached the predetermined temperature and is active. The preventive action could also be a "soft" prevention action as a recommendation where the driver is requested to postpone or delay starting the engine 2 but also has the option to override the preventive function if needed, for example due to safety reasons if the vehicle is parked but quickly has to move, for example due to a hazard such as a fire nearby or another emergency situation.

Once the temperature of the NOx sensor 308 is determined, or estimated, to be equal to or exceed the predetermined threshold, the preventive action may terminate and the engine is allowed to start, in step S108.

The control unit 100 is, in one implementation, configured to receive signals from the internal temperature sensor 310a of the NOx sensor indicative of the temperature of the NOx sensor. In other possible implementations, the control unit 100 is configured to receive signals from the sensor 310b indicative of the temperature in the exhaust gas transfer pipe 302, here upstream of the NOx sensor 308, from which signals the control unit 100 can calculate or model the temperature of the NOx sensor 308. If the internal temperature sensor 310a of the NOx sensor is used, the sensor 310b may be omitted for the purpose of determining the temperature of the NOx sensor 308.

Once the engine 2 is started cold start diagnostics and/or on-board monitoring of emissions can be initiated. With the method proposed herein, the cold start diagnostics and/or on-board monitoring can be initiated and utilized with high accuracy from the instant that the engine 2 is started due to that the NOx sensor 308 will already be heated up and active. Thus, emission control may be improved during cold starts. The NOx sensor 308 may be activated when the measured temperature of the NOx sensor 308 exceeds or is equal to the predetermined threshold. The NOx sensor 308 itself may provide a signal to the control unit 100 that it is active and ready to provide NOx emission measurements data.

The heater 312 is controllable by the control unit 100 to heat the NOx sensor 308 at a heating rate to vaporize water accumulated on the NOx sensor 308 such that damage to the NOx sensor 308 due to expanding water vapor is prevented.

The heater 312 may comprise an electrical heating element or a heating element powered by the same fuel as the engine 2. Using an electrical heating element provides for a versatile heating element that can be used with almost any type of exhaust aftertreatment system since electric power sources are included in most vehicles. However, using a heating element powered by the same fuel as the engine eliminates the need for an electrical power source, thus saving energy in the electrical energy sources of the vehicle that may be used for other systems in need of electrical energy. For example, a diesel driven burner, or a hydrogen driven heater may be used, or a heater using some other type of available chemical fuel. Further, an air pump in the exhaust aftertreatment system may be used to increase the air flow going through the system for heating the NOx sensor, possibly in combination with one or more of the other mentioned types of heaters.

The control unit 100 is configured for controlling NOx emission during start of a vehicle 1 comprising an exhaust aftertreatment system 300 and a NOx sensor 308. The control unit 100 being is configured to determine a temperature of the NOx sensor 308 by acquired sensing data from a temperature sensor 310a of the NOX sensor 308 or from a sensor 310b in the exhaust aftertreatment system, or by receiving a signal from the NOx sensor 308 itself indicative of the present state of the NOx sensor. If the determined temperature of the NOx sensor 308 is below a predetermined threshold and thus needs heating, the control unit 100 is configured to initiate heating of the NOx sensor 308. If the heating is initiated, the control unit 100 is configured to control a preventive action for delaying engine start until the temperature of the NOx sensor is determined to exceed or being equal to the predetermined threshold.

A control unit may include a microprocessor, microcontroller, programmable digital signal processor or another programmable device. Thus, the control unit comprises electronic circuits and connections (not shown) as well as processing circuitry (not shown) such that the control unit can communicate with different parts of the truck such as the brakes, suspension, driveline, in particular an electrical engine, an electric machine, a clutch, and a gearbox in order to at least partly operate the truck. The control unit may comprise modules in either hardware or software, or partially in hardware or software and communicate using known transmission buses such as CAN-bus and/or wireless communication capabilities. The processing circuitry may be a general-purpose processor or a specific processor. The control unit comprises a non-transitory memory for storing computer program code and data upon. Thus, the skilled addressee realizes that the control unit may be embodied by many different constructions.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims.

The invention claimed is:

1. A method for NOx emission control during start of a vehicle comprising an exhaust aftertreatment system, an engine, and a NOx sensor, the method being characterized by the steps of:
   determining a temperature of the NOx sensor;
   if the determined temperature of the NOx sensor is below a predetermined threshold, initiating heating of the NOx sensor;
performing a preventive action for preventing engine start until the determined temperature of the NOx sensor exceeds or is equal to the predetermined threshold; and
   initiating cold start on board diagnostics and/or on-board monitoring once the engine is started, to monitor cold start NOx emissions over time; and
   tracking cold start performances of the vehicle over time.

2. The method according to claim 1, wherein performing a preventive action comprises generating a signal with instructions informing the driver to delay starting the engine.

3. The method according to claim 2, wherein the signal is generated upon initiating heating of the NOx sensor.

4. The method according to claim 1, further comprising activating the NOx sensor when the determined temperature of the NOx sensor exceeds or is equal to the predetermined threshold.

5. The method according to claim 1, wherein heating of the NOx sensor is performed such that water accumulated on the NOx sensor is vaporized in a controlled way so that damage to the NOx sensor due to expanding water vapor is prevented.

6. A non-transitory computer readable medium carrying a computer program comprising program code for performing the steps of claim 1 when said program code is run on a computer.

7. A control unit for controlling NOx emission during start of a vehicle comprising an exhaust aftertreatment system and a NOx sensor, the control unit being configured to perform the steps of the method according to claim 1.

8. An exhaust aftertreatment system of a vehicle characterized by:
   an exhaust pipe section for transferring exhaust gas towards an exhaust gas outlet;
   a NOx sensor arranged in the exhaust pipe for measuring a level of nitrogen oxides in the exhaust gas;
   a heater arranged to heat the NOx sensor, and
   a sensor for determining a temperature of the NOx sensor; and
   the system further comprising a control unit configured to:

cause a preventive action for preventing engine start until a determined temperature of the NOx sensor exceeds or is equal to the predetermined threshold;
initiate cold start on board diagnostics and/or on-board monitoring once the engine is started, to monitor cold start NOx emissions over time, and
track cold start performances of the vehicle over time.

9. The exhaust aftertreatment system according to claim 8, wherein the control unit is configured to generate a signal with instructions informing the driver to delay starting the engine.

10. The exhaust aftertreatment system according to claim 8, wherein the heater is controllable to heat the NOx sensor at a heating rate to vaporize water accumulated on the NOx sensor such that damage to the NOx sensor due to expanding water vapor is prevented.

11. The exhaust aftertreatment system according to claim 8, wherein the heater comprises an electrical heating element or a heating element powered by the same type of fuel as the engine.

12. A vehicle comprising an exhaust aftertreatment system according to claim 8.

\* \* \* \* \*